April 10, 1928.
F. P. MAXSON
COPING SAW
Filed Dec. 6, 1924
1,665,317
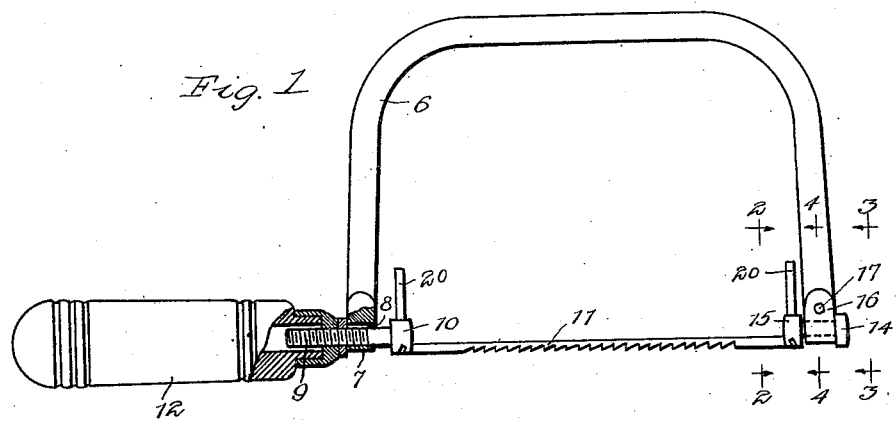
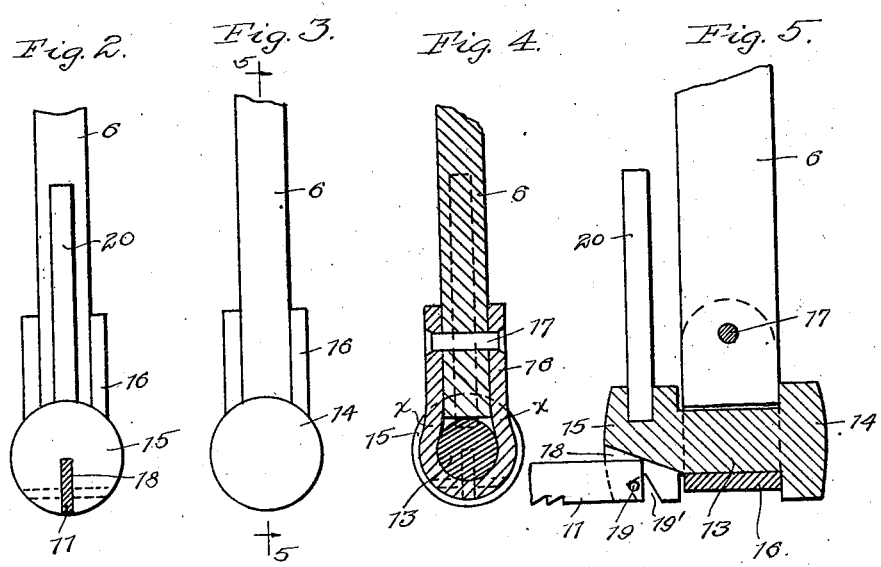
Inventor
Frank P. Maxson
By Brown, Boettcher & Diener
Attys.

Patented Apr. 10, 1928.

1,665,317

UNITED STATES PATENT OFFICE.

FRANK P. MAXSON, OF CHICAGO, ILLINOIS.

COPING SAW.

Application filed December 6, 1924. Serial No. 754,283.

My invention relates to coping saws and has for its object the provision of an improved and simplified structure, particularly in connection with the means for holding the saw blade in the frame.

In the accompanying drawings,

Figure 1 is an elevational view of the saw, parts being broken away for illustrative purposes;

Figure 2 is a fragmentary sectional view, on an enlarged scale, taken on the line 2—2 of Figure 1, and looking in the direction of the arrows.

Figure 3 is a fragmentary elevational view, on an enlarged scale, looking in the direction of the arrows 3—3 of Figure 1.

Figure 4 is a fragmentary sectional view, on an enlarged scale, taken on the line 4—4 of Figure 1 and looking in the direction indicated by the arrows; and Figure 5 is a fragmentary sectional view, on an enlarged scale, taken on the line 5—5 of Figure 3 and looking in the direction indicated by the arrows.

The frame, of the usual U-shape, is shown at 6. At one end this frame is provided with a heading 7 having an opening 8 therethrough through which passes the threaded stem 9 of the saw blade receiving head 10. The saw blade is shown at 11 and its end is held in the head 10 in the same manner that its other end is held in the other blade receiving member, as will be described presently.

On the other side of the heading 7 the stem 9 threads into the handle 12 which may be turned, as is known in the art, to draw up and tighten the saw blade.

The other saw blade receiving member is an integral piece comprising a reduced central stem 13 with heads 14 and 15, respectively, at the ends thereof. A strap 16, of somewhat resilient metal, fits snugly between the heads 14 and 15, and receives the stem in the manner of a sling, the ends of the straps engaging on opposite sides of the frame member and clamping the same therebetween. The ends of the straps are riveted to the frame member, as indicated at 17, or are otherwise suitably secured thereto, the strap thus holding the receiving member to the end of the frame member, as shown in the drawings. The strap is bent inward slightly, as shown at X, X, so that it may fit both the stem and the end of the frame member and, thus required to be snapped over the stem in assembling, facilitates the work in this regard. The result is a simple, effective structure, inexpensive to construct and assemble.

The end of the saw blade extends into a slot 18 in the head 15, and a pin 19, through the blade, engages in the oblique cross-slot 19', thus retaining the end of the saw blade. Each of the heads 10 and 15 is provided with a pin 20 by means of which the saw blade can be turned, on its own axis, to assume any desired position relative to the frame.

I claim:

In combination in a coping saw, a U-shaped frame, a cylindrical securing member provided at each end with an enlarged permanent head, a resilient strap snapped over the securing member between said heads and secured to one end of the frame, the inner head of said member being adapted for reception of a cooperating securing element at one end of a saw blade, and means at the other end of the frame adapted for cooperation with a securing element at the other end of the saw blade.

In witness whereof, I hereunto subscribe my name this 4th day of December, 1924.

FRANK P. MAXSON.